Aug. 14, 1923.
P. A. WHITE
DEMOUNTABLE SPLIT RIM
Filed April 20, 1921
1,465,070
5 Sheets-Sheet 2
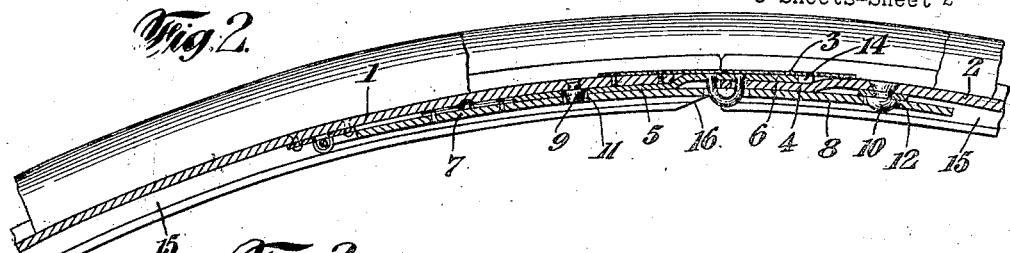
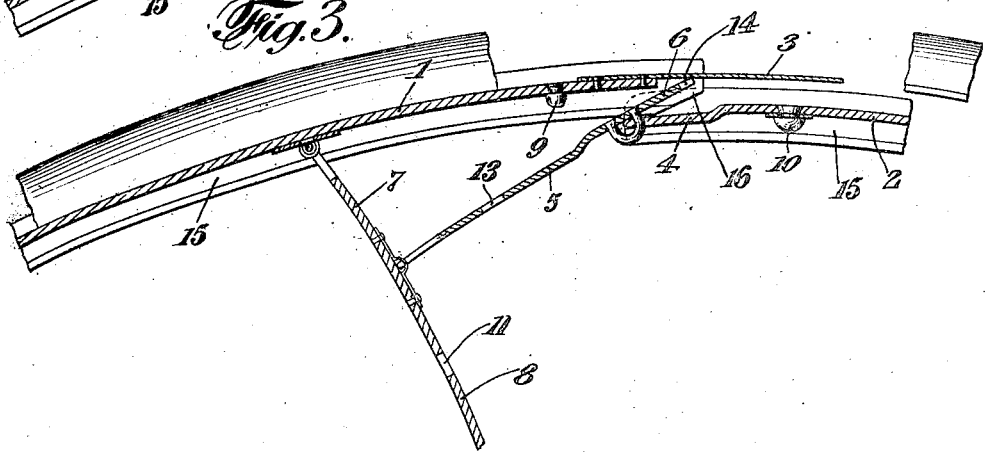
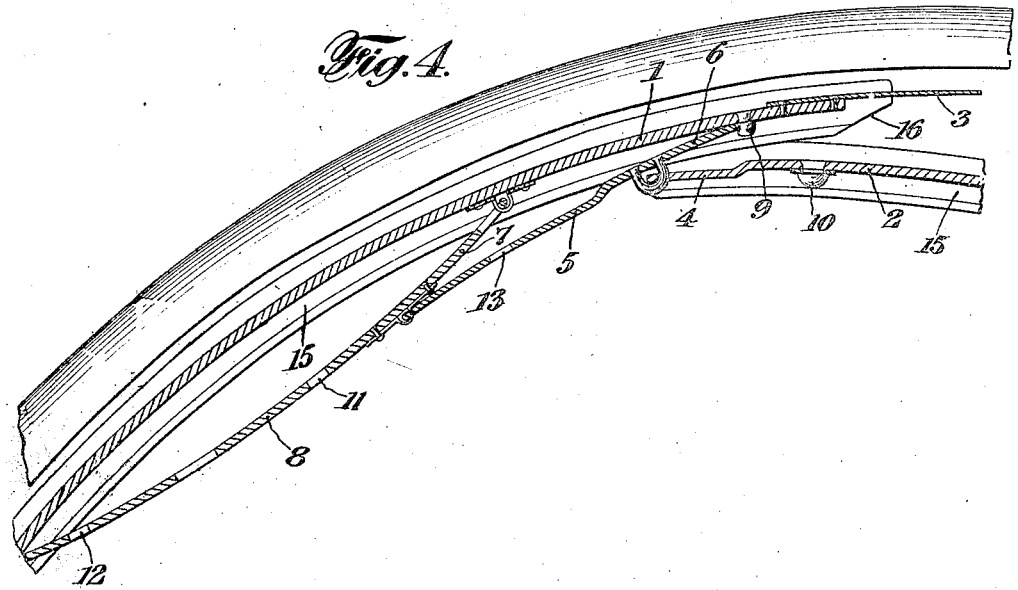
INVENTOR
Phillip A. White
BY
Prindle, Wright and Small
ATTORNEYS Aug. 14, 1923.
P. A. WHITE
1,465,070
DEMOUNTABLE SPLIT RIM
Filed April 20, 1921   5 Sheets-Sheet 3
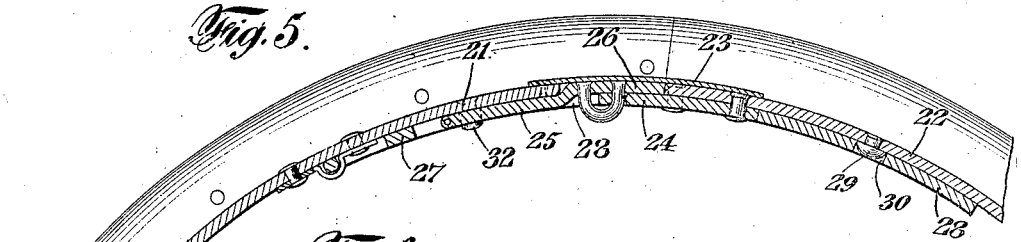
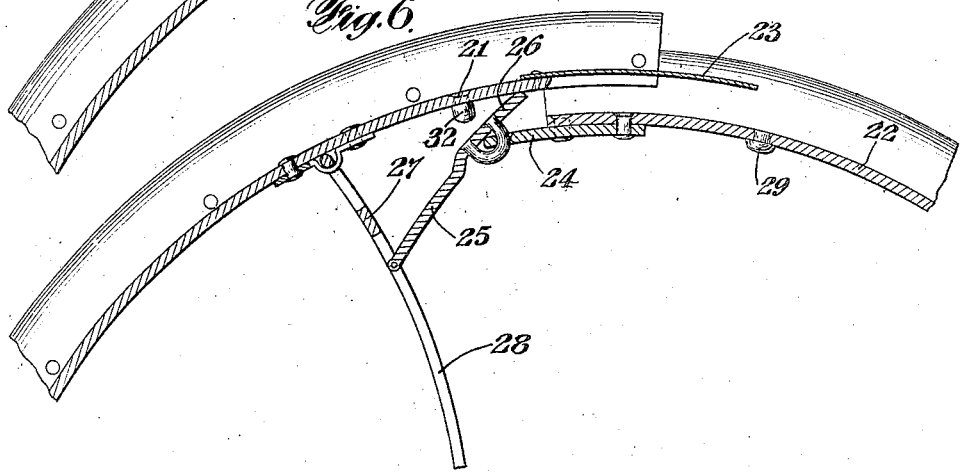
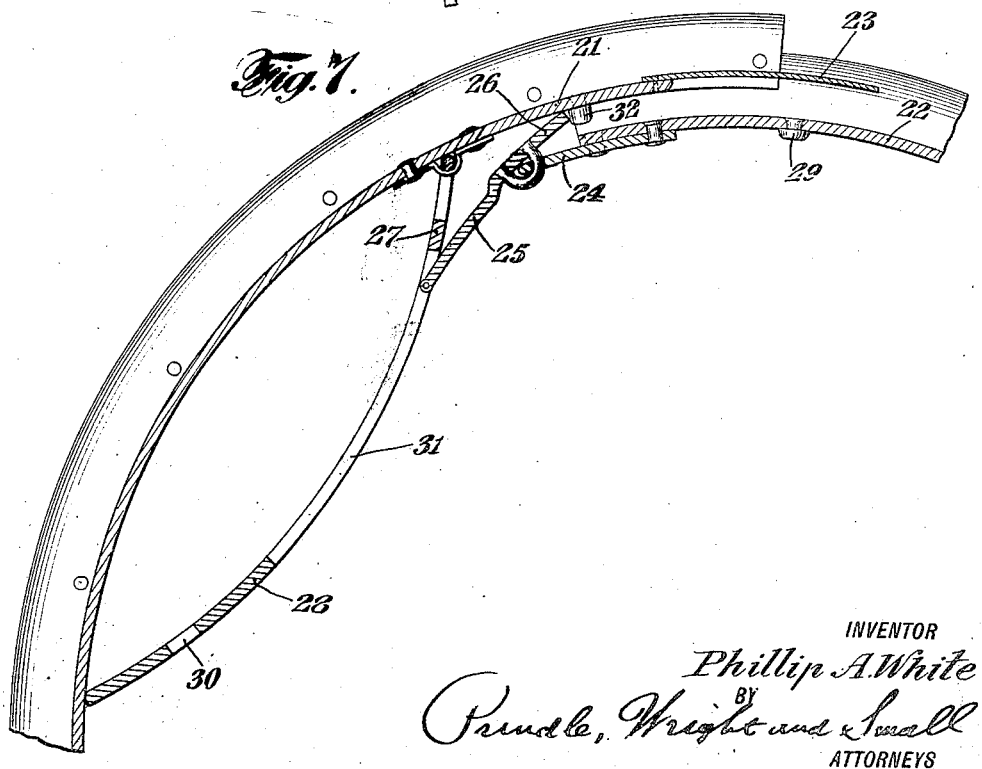
INVENTOR
Phillip A. White
BY
Prindle, Wright and Small
ATTORNEYS

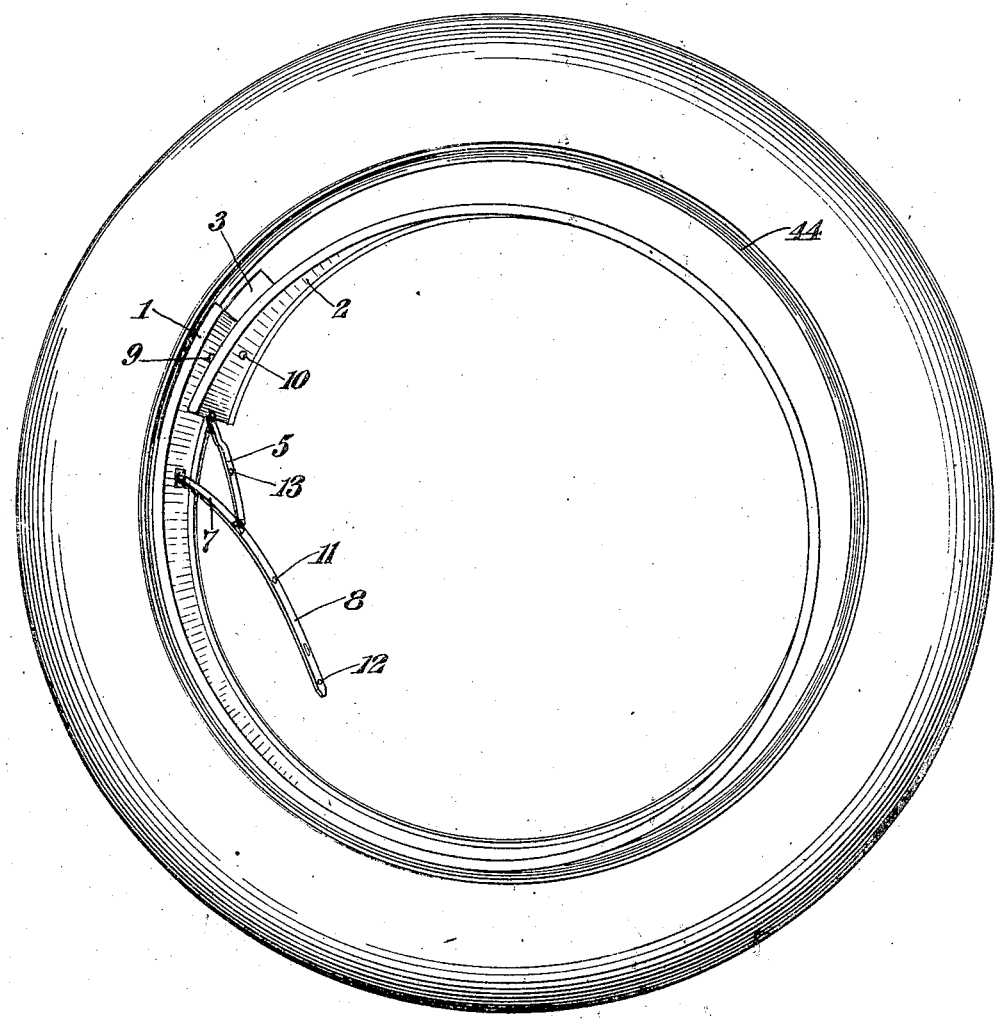

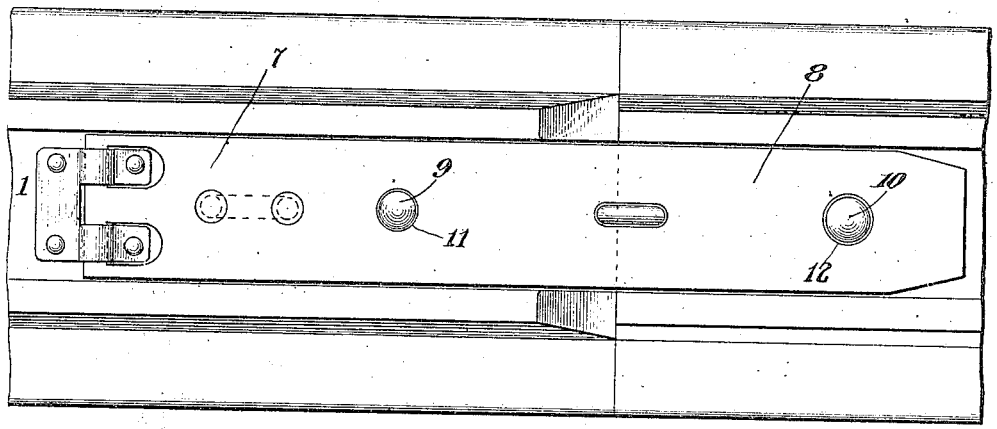
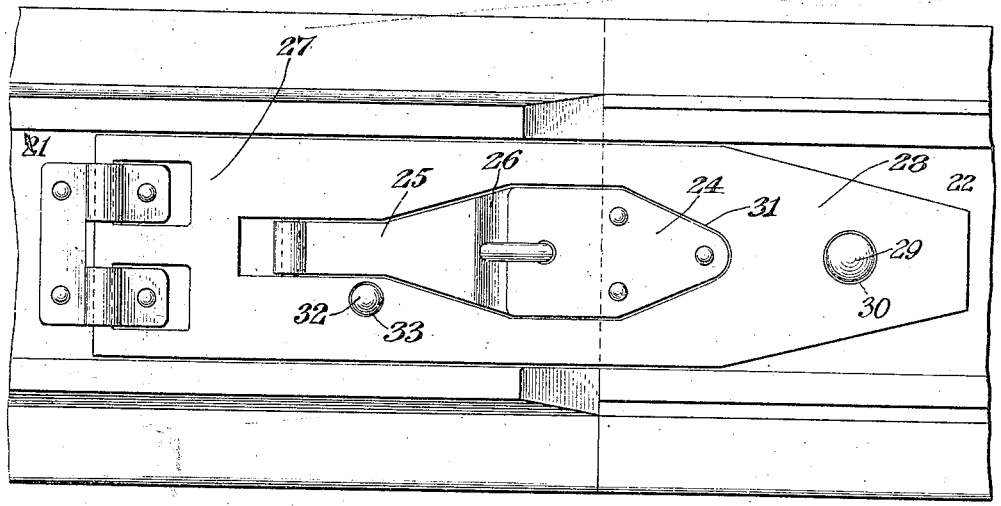

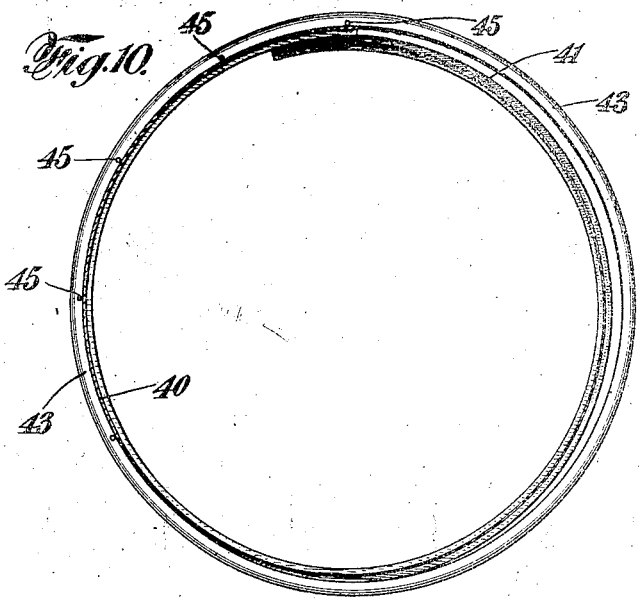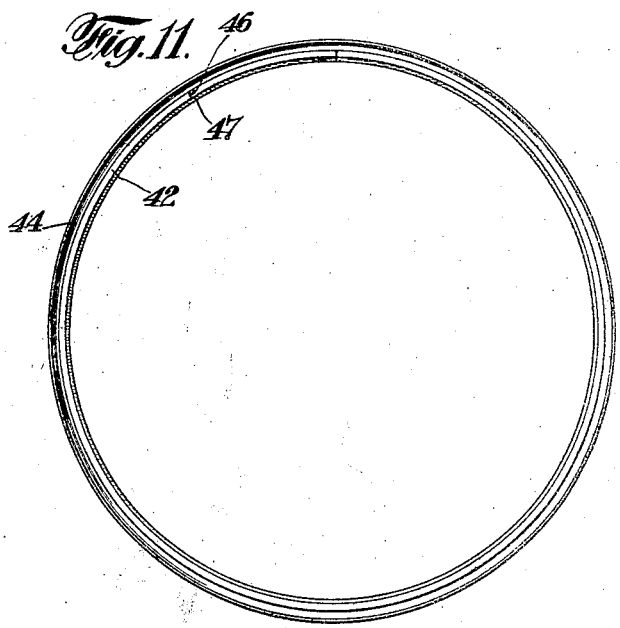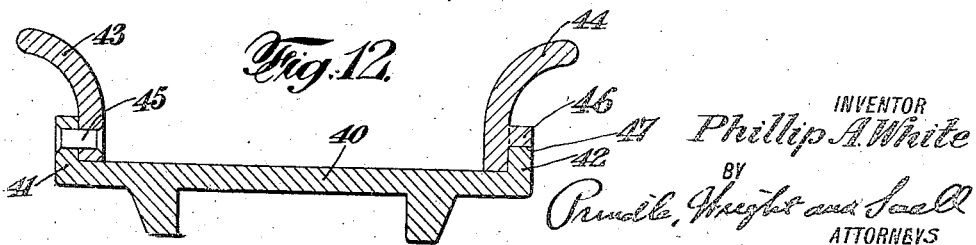

Patented Aug. 14, 1923.

1,465,070

UNITED STATES PATENT OFFICE.

PHILLIP A. WHITE, OF LONG ISLAND CITY, NEW YORK.

DEMOUNTABLE SPLIT RIM.

Application filed April 20, 1921. Serial No. 462,984.

*To all whom it may concern:*

Be it known that I, PHILLIP A. WHITE, a citizen of the United States, residing at Long Island City, in the county of Queens and State of New York, have invented a certain new and useful Demountable Split Rim, of which the following is a specification.

My invention relates to demountable split rims and has for its object to provide a split rim or similar structure adapted to be reduced in diameter by forcing one end past the other.

A further object of my invention is to provide a simple and inexpensive attachment for demountable split rims adapted to force one end of the rim past the other to reduce the diameter of the rim.

A further object of my invention is to provide an attachment for reducing the diameter of a demountable split rim and adapted to maintain the rim temporarily in its reduced position.

A further object of my invention is to provide an attachment for reducing the diameter of a demountable split rim and adapted easily to force the rim from its reduced position back to normal position.

A further object of my invention is to provide an attachment for reducing the diameter of a demountable split rim and adapted to secure the abutting ends of the rim against accidental movement from their normal position.

A further object of my invention is to provide a cover plate for the space between the abutting ends of a split demountable rim.

A further object of my invention is to provide a rim so constructed as to retain a tire thereon securely against sidewise and creeping movement and adapted easily to be reduced in diameter by forcing one end past the other.

Other objects of my invention will be apparent from the following description and from the accompanying drawings of illustrative embodiments thereof, in which—

Figure 1 is a perspective of a tire with a split, demountable rim therein reduced in diameter by one embodiment of the attachment therefor;

Figure 2 a longitudinal section of a portion of a split, demountable rim in normal position with one embodiment of an attachment thereon for reducing the diameter of the rim;

Figure 3 a view similar to Figure 2 with the attachment in intermediate position;

Figure 4 a view similar to Figure 3 with the rim reduced in diameter for removing a tire therefrom and held temporarily in that position;

Figure 5 a longitudinal section of a portion of a rim in normal position with another embodiment of the attachment thereon;

Figure 6 a view similar to Figure 5 with the attachment in intermediate position;

Figure 7 a view similar to Figure 6 with the rim reduced in diameter for removing a tire therefrom and held temporarily in that position;

Figure 8 a plan of the attachment embodiment shown in Figure 2 of the drawings;

Figure 9 a plan of the attachment embodiment shown in Figure 5 of the drawings;

Figure 10 a longitudinal section through a rim in its position of reduced diameter and showing one of its rings secured thereto;

Figure 11 an elevation of a rim in its normal position showing its other ring detachably secured thereto; and Figure 12 a transverse section through a rim and both of its rings.

Similar reference characters refer to similar parts throughout the drawings.

In the embodiment of Figures 1, 2, 3, and 4 of the drawings, reference character 1 indicates the portion of a split rim on one side of and adjacent its transverse cut or split, reference character 2 the portion of the rim on the other side of and adjacent said cut or split, and reference character 3 a cover plate for the transverse cut itself. Adjacent the end of portion 2, which preferably is depressed as indicated at 4, is mounted a lever 5 having an extension 6 thereon. A lever 7 mounted on portion 1 of the rim forms with lever 5 a toggle adapted to be operated by a handle 8.

When the rim is in normal position as disclosed in Figure 2 of the drawings, extension 6 will fit in depression 4 and the toggle and handle will lie close to the rim, between and not extending beyond the usual spacing beads 15 on the bottom of the rim.

The cut or split will be covered by cover plate 3, thus protecting the inner tube of the tire from contact therewith. The ends of the rim will be locked together securely by projections 9 and 10 on the rim passing through corresponding openings 13, 11, and 12 in lever 5 and in handle 8.

When it is desired to reduce the diameter of the rim, handle 8 is operated as indicated in Figures 3 and 4. This causes extension 6 on lever 5 to press against cover plate 3 secured on end portion 1, thus forcing end 1 up and end 2 down so that the continued operation of handle 8 will force one end past the other as indicated in Figures 3 and 4 of the drawings. The movement is facilitated in its early stages by the shape of spacing beads 15 on end portion 1 which are cut away as indicated at 16 to form an incline. When in reduced position, extension 6 will engage behind projection 9 to hold the parts temporarily in reduced position, the projection preferably engaging a notch 14 provided in the end of extension 6 for that purpose. When it is desired to return the parts to normal position, a slight pressure on handle 8 or on one of the abutting rim parts will enable extension 6 to pass projection 9, the springiness of the rim tending to move it part way to normal position, the remainder of the distance being attained by operation of handle 8.

In the embodiment of Figures 5, 6, and 7 of the drawings, reference character 21 indicates the portion of a split rim on one side of and adjacent its transverse cut or split, reference character 22 the portion of the rim on the other side of and adjacent said cut or split, and reference character 23 a cover plate for the transverse cut itself. End portion 22 preferably has secured underneath thereof an extension plate 24, adjacent the end of which is mounted a lever 25 having an extension 26 thereon. A lever 27 mounted on portion 21 of the rim forms with lever 25 a toggle adapted to be operated by a handle 28. When in reduced position, extension 26 will engage behind projection 32 to hold the parts temporarily in reduced position, a slight pressure on handle 28 or on one of the abutting rim parts enabling the extension to pass the projection for the rim to return to normal position. When the rim is in normal position as disclosed in Figure 5, extension 26 will lie on plate 24 outside the end of the rim, the other parts lying close to the rim and the split covered by cover plate 23.

When the rim is in normal position, the ends are locked together by projections 29 and 32 engaging openings 30 and 33 (Figure 9) in handle 28. The operation is the same as in Figures 1, 2, 3, and 4.

The embodiment of Figures 1, 2, 3, and 4 differs principally from the embodiment of Figures 5, 6, and 7 in weight and width, the former being adapted for light, narrow rims and the latter for heavy, wide rims. Figures 8 and 9 represent a difference in construction, the handle 28, as shown in Figure 9, being wide enough to permit a cut-out portion 31 in which fits lever 25 and extension plate 24. In both embodiments, the parts are so proportioned as to utilize the benefits of leverage in decreasing the diameter of the rim so that an excessive amount of force is not necessary even for heavy rims.

When rims of the type disclosed are used for pneumatic tires it is necessary to have flanges to hold the tire in place. If unitary flanges of the necessary height are used it is difficult to force one end of the rim past the other to decrease the diameter of the rim to the size desired, as the bending is in the plane of the flanges. If loose rings are used with a low, integral flange, the rings are difficult to handle when changing tires and the tire is liable to creep on the rim with the rings and cut the valve stem. In order to obviate these difficulties, a short flange and ring construction may be used as shown in Figures 10, 11, and 12 of the drawings. In this construction, a rim 40 is shown with low, unitary flanges 41 and 42 and with rings 43 and 44.

One of these rings, as ring 43 (Figures 10 and 12), is secured preferably permanently and in any desired manner as by rivets 45 to the portion of the rim adjacent its split and on only one side thereof for approximately one-third of the distance around the rim. The short distance the ring is secured to the rim will not interfere materially with the resistance of the rim to bending and yet it has all the advantages of a unitary flange of the same height. Figure 10 of the drawings shows the rim reduced in diameter with the ring 43 secured to flange 41 in the manner described.

The other ring, as ring 44 (Figures 11 and 12), is removable from the rim when the diameter of the rim is reduced in order to change tires, but to prevent the tire and ring from creeping on the rim, ring 44 is provided with any desired number of keys 46 adapted to fit in corresponding notches 47 on unitary, low flange 42 when the parts are in normal position.

The rim construction described thus combines the advantages of the fixed flange and the loose ring construction without the disadvantages commonly flowing from the use of either construction.

Many modifications of my invention will be apparent to those skilled in the art without departing therefrom or from the scope of the claims, my invention not being limited to the particular embodiments thereof chosen for purposes of illustration, but comprising a rim adapted to be decreased in size by forcing the abutting end portions past each other into a superimposed position by means of members lying closely adjacent the rim when in normal position, utilizing the benefits of leverage to render the operation easy, and comprising a rim easily decreased in size and adapted to maintain a tire thereon without sidewise or creeping movement.

What I claim and desire to protect by Letters Patent is:

1. In a rim having abutting end portions formed by a transverse cut through said rim, means to decrease the size of said rim by forcing said abutting ends past each other into a superimposed position comprising a toggle having its members secured one to each abutting end portion, an extension on one of said members adapted to force said abutting ends into position to be superimposed, and means to operate said toggle.

2. In a rim having abutting end portions formed by a transverse cut through said rim, means to decrease the size of said rim by forcing said abutting ends past each other into a superimposed position comprising a toggle having its members secured one to each abutting end portion, an extension on one of said members adapted to operate on the rim portion to which it is not attached to force said abutting ends into position to be superimposed, and means to operate said toggle.

3. In a rim having abutting end portions formed by a transverse cut through said rim, means to decrease the size of said rim by forcing said abutting ends past each other into a superimposed position comprising a cover over said transverse cut, and means mounted on one portion adapted to operate against said cover to force said abutting ends into position to be superimposed.

4. In a rim having abutting end portions formed by a transverse cut through said rim, means to decrease the size of said rim by forcing said abutting ends past each other into a superimposed position comprising a cover over said transverse cut secured to one of said abutting end portions, a toggle having its members secured one to each abutting end portion, and an extension on one of said members adapted to operate against said cover to force said abutting ends into position to be superimposed.

5. In a rim having abutting end portions formed by a transverse cut through said rim, means to decrease the size of said rim by forcing said abutting ends past each other into a superimposed position comprising a toggle having one of its members secured adjacent one abutting end portion and the other member secured at a distance removed from said abutting end portion, and means to operate said toggle.

6. In a rim having abutting end portions formed by a transverse cut through said rim, means to decrease the size of said rim by forcing said abutting ends past each other into a superimposed position comprising a toggle having its members secured one to each abutting end portion, an extension on one of said members, and a projection on the abutting end portion to which said last named member is not secured adapted to be engaged by said extension when the abutting ends are in superimposed position to maintain said superimposed position.

7. In a rim having abutting end portions formed by a transverse cut through said rim, means to decrease the size of said rim by forcing said abutting ends past each other into a superimposed position comprising a toggle having its members secured one to each abutting end portion, one of which members is provided with an opening, and means on said rim adapted to engage said opening to lock said rim in normal position.

8. In a rim having abutting end portions formed by a transverse cut through said rim, means to decrease the size of said rim by forcing said abutting ends past each other into a superimposed position comprising a toggle having its members secured one to each abutting end portion, a handle for said toggle provided with an opening, and means on said rim adapted to engage in said opening.

9. In a rim having abutting end portions formed by a transverse cut through said rim, means to decrease the size of said rim by forcing said abutting ends past each other into a superimposed position comprising a toggle having its members secured one to each abutting end portion, one of which members is provided with an opening, a handle for said toggle provided with an opening, and means on said rim adapted to engage in said openings.

10. In a rim having abutting end portions formed by a transverse cut through said rim, means to decrease the size of said rim by forcing said abutting ends past each other into a superimposed position comprising a toggle having its members secured one to each abutting end portion, an extension on one of said members adapted to force said abutting ends into position to be superimposed, an opening in said toggle, and means on said rim adapted to engage in said opening to lock said rim when in normal position and to be engaged by said extension when said rim is in superimposed position to maintain said position.

11. In a rim having abutting end portions formed by a transverse cut through said rim, means to decrease the size of said rim by forcing said abutting ends past each other into a superimposed position comprising a plate extending in an offset parallel plane from one abutting end portion, a lever mounted adjacent the end of said plate and provided with an extension fitting in the depression formed by said extension when the rim is in normal position, and a lever pivoted to said first member and to the other abutting end portion.

12. In a rim having abutting end portions formed by a transverse cut through said rim, means to decrease the size of said rim by forcing said abutting ends past each other into a superimposed position comprising a toggle having its members secured to each abutting end portion and an extension on one of said members adapted to force said abutting ends into position to be superimposed, said extension being offset from the member on which it is mounted in order to enable said means to occupy a minimum space when the rim is in normal position.

13. In a rim having abutting end portions formed by a transverse cut through said rim, means to decrease the size of said rim by forcing said abutting ends past each other into a superimposed position comprising a plate extending underneath one abutting end portion, a lever pivoted on said plate and having an extension adapted to lie along said plate between its end and the abutting end of the rim, and a lever pivoted to said first named lever and to the other abutting end portion.

14. In a rim having abutting end portions formed by a transverse cut through said rim, means to decrease the size of said rim by forcing said abutting ends past each other into a superimposed position comprising a toggle having its members secured one to each abutting end portion, and a handle for said toggle having a cut-out portion in which one of said members is adapted to fit when said rim is in normal position.

15. In a rim having abutting end portions formed by a transverse cut through said rim, means to decrease the size of said rim by forcing said abutting ends past each other into a superimposed position comprising a plate extending underneath one abutting end portion, a toggle having its members secured one to said plate and the other to the other abutting end portion, and a handle for said toggle having a cut-out portion adapted to receive said plate and one of the toggle members when said rim is in normal position.

16. In a rim having abutting end portions formed by a transverse cut through said rim, means to decrease the size of said rim by forcing said abutting ends past each other into a superimposed position comprising a toggle having members of different length secured one to each abutting end portion, the member of shorter length having means thereon to operate said toggle.

17. In a rim having abutting end portions formed by a transverse cut through said rim, means to decrease the size of said rim by forcing said abutting ends past each other into a superimposed position comprising levers secured to said abutting end portions, flanges on said rim, and rings held on said rim by said flanges, one of said rings being secured to said rim only at and adjacent one of said abutting portions and the other ring detachably secured against rotation around the rim.

18. In a rim having abutting end portions formed by a transverse cut through said rim, a cover plate secured to one end portion and extending over and beyond said transverse cut, and means secured to said rim adapted to co-operate with said plate to force said abutting ends into different planes.

19. In a rim having abutting end portions formed by a transverse cut through said rim and provided with flanges, rings on said rim between said flanges, one of said rings being secured to its adjacent flange only at and adjacent one of said abutting end portions.

20. In a rim having abutting end portions formed by a transverse cut through said rim and provided with flanges, rings on said rim between said flanges, one of said rings being held from rotation around said rim by a pin and slot engagement with its adjacent flange.

21. In a rim having abutting end portions formed by a transverse cut through said rim and provided with flanges, rings on said rim between said flanges, one of said rings being secured to its adjacent flange only at and adjacent one of said abutting end portions and the other of said rings being held from rotation around said rim by a pin and slot engagement with its adjacent flange.

22. As an article of manufacture, a toggle one member of which has an extension thereon and the other member of which has a handle thereon, said first member adapted to be pivoted to one portion of the split rim between the toggle member and the extension and the other member adapted to be pivoted to the other portion of the split rim at the end remote from said handle.

In testimony that I claim the foregoing, I have hereunto set my hand this 13th day of April, 1921.

PHILLIP A. WHITE.